United States Patent Office 3,264,476
Patented August 2, 1966

3,264,476
HOLDER OF A FLUOROGLASS ROD FOR USE IN RADIATION DOSIMETRY
Ryosuke Yokota, Yokohama-shi, and Saburo Nakajima, Kawasaki-shi, Japan, assignors to Tokyo Shibaura Electric Co., Ltd., Kawasaki-shi, Japan, a corporation of Japan
Filed Aug. 14, 1963, Ser. No. 302,104
Claims priority, application Japan, Aug. 27, 1962, 37/48,673
5 Claims. (Cl. 250—83)

This invention relates to a holder of a small fluoroglass rod utilized in a radiation dosimeter.

It is well known that when a special phosphate glass containing silver is exposed to such radiation as $\alpha$ ray, $\beta$ ray, $\gamma$ ray, X-ray, electron ray and the like, numerous luminescent centers, the number thereof being proportional to the exposure dose, are created in the body of glass. These luminescent centers are very stable so that they do not disappear even after the exposed glass is stored for a long time at room temperature. It is also well known that, when subjected to ultraviolet rays having a wavelength of about 365 m$\mu$, these exposed glass bodies will produce an orange fluorescence, but the intensity of the fluorescence is proportional to the number of luminescent centers and hence to the initial exposure dose.

While various types of radiation dosimeters have been proposed, we have invented an improved dosimeter as disclosed in our copending application Serial No. 302,080 filed August 14, 1963; briefly stated, according to said improved dosimeter, one body of fluoroglass which has been exposed to radiation is inserted in a holder while parallel ultraviolet rays are passed in the longitudinal direction through the glass body except the peripheral portion of the side surface thereof, a component of the fluorescence which is produced in the glass body and which is perpendicular to the direction of the ultraviolet rays is obtained through the upper surface of the glass body and this component is transmitted to a photomultiplier to measure the dose. With a dosimeter of the prior art, contamination, if any, of the surface of the glass body will also produce fluorescence upon excitation of ultraviolet rays. Such undesirable fluorescence contains light rays which pass through red or orange filters and cause erroneous readings by mixing with the original fluorescence. In the improved dosimeter described in aforesaid patent application the presence of contamination on the surface of the exposed glass body does not affect in any appreciable extent the results of the measurement. In the dosimeter, of the aforesaid patent application, a cubic fluoroglass body or rod type body is usually inserted in the holder. As a cubic body, it is usual to use a body of relatively large dimensions, say for example, a body of 8 mm. x 8 mm. x 4.7 mm. so that it can be easily mounted in or removed from the holder. However, when using a relatively small rod, for example, of 1 mm. diameter and 6 mm. length, it is very difficult to handle.

Such small fluoroglass rod is advantageous in that it can be easily inserted in various portions of a human body to be irradiated by radiations, or used with a simulated human body to be tested under irradiation. Thus, such small rods are suitable to be inserted to body parts where the dose thereat is to be measured, with minimum effect of the inserted probe, and also to measure in detail the distribution of the dose. On the other hand there are defects to this procedure as contaminating of the surface of glass rod, cleaning the contaminated glass rod, and the necessity of taking minute care of inserting the glass rod in position and removing it from the holder. More particularly, since a small clearance of the order of 0.01 to 0.03 mm. is usually provided between the outer surface of the rod and the bore of the holder for facilitating insertion, there is a tendency for the rod to move laterally within said clearance during measurement thus affecting reproducibility of the measured results.

Accordingly, it is the principal object of this invention to provide an improved glass holder suitable for use in the dosimeter of the aforesaid patent application so constructed that the glass rod is simply and accurately fixed in position in the holder, the glass rod does not move laterally during measurement and that the glass rod can be removed very easily.

Briefly stated, the holder of this invention comprises a pair of spaced outer frames, a pair of supporting plates each mounted on the inner surface of one of said outer frames, an intermediate frame positioned between said supporting plates. Each of said outer frames is provided with a slit slot adapted to pass parallel ultraviolet rays. A notch, preferably of V shape, is provided on the upper edge of each of the supporting plates in axial alignment with a central bore to receive the end portion of the glass rod. A removable holding member is provided to hold the glass rod in said notch. The diameter of said slit bore is made slightly smaller than that of the glass rod so as to prevent parallel fluorescent rays from reaching the peripheral portion of the rod.

While the specification concludes with claims particularly pointing out and distinctly claiming the subject matter of the invention, it is believed that the invention will be better understood from the following description taken in connection with the accompanying drawing; in which:

Figure 1:
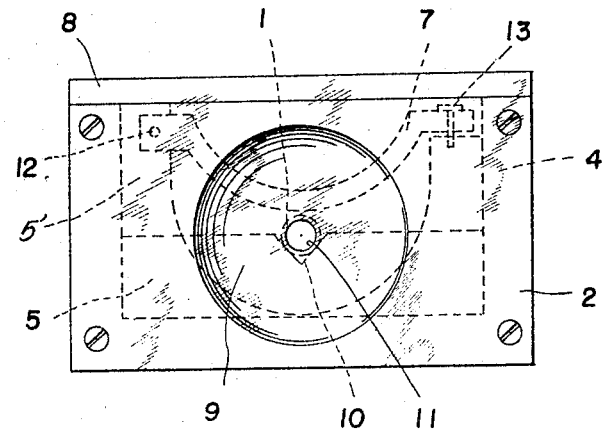
FIG. 1 is an enlarged front view of a glass holder contemplated herein.
Figure 2:
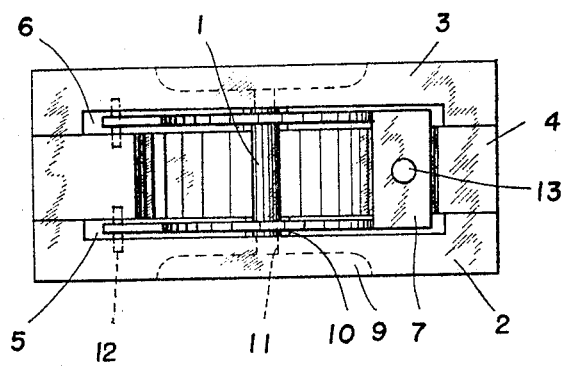
FIG. 2 shows an enlarged plan view of the glass holder contemplated herein with the cover removed.

As an illustration a glass rod having a diameter of 1 mm.±0.02 mm. and a length of 6 mm.±0.05 mm. with opposite end surfaces accurately perpendicular to the axis of rod and perfectly polished to plane. The holder shown in the drawing comprises an assembly of seven metallic parts, viz. two spaced apart outer frames 2 and 3, an intermediate frame 4, two supporting plates 5 and 6, a holding member 7 and a cover plate 8. On the outer side of the outer frames 2 and 3, there are respectively provided circular recesses 9, and a slit 11 having a smaller diameter than that of the glass rod, for example 0.8 mm. diameter for a glass rod of 1 mm. diameter, is provided at the center of each outer frame. Each of the outer frames 2 and 3 is provided with rectangular recess 5' on its inner side, and supporting plate 5 for the glass rod 1 is inserted in the lower portion of said recess, said supporting plate having a V shaped notch 10 on the upper edge thereof. Curved legs of the holding member 7 are positioned in the upper space in each of said inner recesses 5', the ends of the legs being supported by pivot pins 12 with their opposite ends fixed to the intermediate frame 4 and the outer frames 2 and 3, respectively. The holding member 7 is arranged to swing about 160 degrees around said pivot pins. The opposite end of the holding member 7 is fixed to the intermediate frame 4 by means of a set screw 13. Since the holding member 7 can hold the glass rod in position by its own weight, the set screw 13 may be omitted in some cases. Also the cover plate 8 may be omitted because it is used for excluding dust and foreign particles and removed when the dosimeter is actually used.

To insert and fix the glass rod in position, the holding member 7 is swung upwardly, the opposite ends of a glass rod 1 which has been exposed to radiation are disposed in the V shaped notches 10 on the supporting plates 5 and the holding member is brought back to the original position. Each end of the glass rod is supported by three points or lines so that it is prevented from moving in the holder and that the axis of the rod is in perfect alignment with that of the slit bore 11. When ultraviolet rays are impinged upon the end surface of the glass rod at right angle thereto, there will be no ultraviolet rays that arrive at the longitudinal side surface of the glass rod because the diameter of the rod is somewhat larger than that of the slit bore and hence there will be no fluorescence emitted from the longitudinal side surface of the rod even if it were more or less contaminated. If the axis were not perfectly aligned, the ultraviolet rays may reach the longitudinal side surface of the glass rod and fluorescence will arise from the contaminated surface.

It is advantageous to provide a small clearance of about 0.1 mm. between both bottom surfaces of the glass rod and the inner side of the outer frame to facilitate insertion and removal of the rod. Such a clearance does not affect the result of measurement since both ends of the glass rod are shielded by the supporting plates and legs of holding member and fluorescent rays emitted from contaminated bottom surfaces of the glass rod are prevented from transpassing into the photomultiplier.

The circular recess 9 on the outside of the outer frame 3 is finished to have black color by applying a nickel black plating, for example, to absorb ultraviolet rays outside of the slit. The purpose of providing a recess of large diameter is to prevent randomly reflected ultraviolet rays from entering into the slit. The inner surface of the supporting plate 5 as well as the holding member are provided with black plating. The inner surface of the inner frame 4 is furnished with a chromium plating to reflect the fluorescent rays, thus directing as much as possible large amount of fluorescent rays toward a photomultiplier (not shown) by reflection.

Mounting of a small glass rod, for example, a rod of 1 mm. diameter 6 mm., in this holder can be effected very simply. Thus a pincette may be used to hold and position the glass rod on the V shaped notch of the supporting plate. Moreover, since the rod is always naturally fixed in the correct position with respect to the slit, the measurements are effected with high degree of reproducibility and accuracy. Removal of the glass rod after measurement is also simple, which also avoids the chance of contaminating the surface of the glass rod.

In accordance with the provisions of the patent statutes, we have explained the principle and operation of our invention, and we have illustrated and described what we consider to present the best embodiment thereof. However, we desire to have it understood that within the scope of the appended claims, the invention may be practiced otherwise than as specifically illustrated and described.

What is claimed is:

1. A fluoroglass rod and holding arrangement for use in radiation dosimetry comprising a fluoroglass rod, a pair of spaced apart outer frames with inner recesses, each having a central bore with a diameter smaller than that of said fluoroglass rod, a pair of supporting plates each mounted in the lower portion of said recesses on the inner side of said frames provided with a notch to support the end of said glass rod in axial alignment with said central bore, a recessed intermediate frame positioned between said supporting plates and a swinging holding member pivoted to said arrangement adapted to hold said glass rod in said notch.

2. An arrangement as claimed in claim 1 wherein the inner surface of said outer frame and the entire surface of said holding member are colored black and the circular inner surface of said intermediate frame is polished to reflect fluorescent rays.

3. An arrangement as claimed in claim 2 wherein said outer frame has a wide circular black recess on its outside around the central bore.

4. An arrangement as claimed in claim 3 wherein there is provided a small clearance between the opposite end surfaces of said fluoroglass rod and the inner surface of said outer frame.

5. An arrangement as claimed in claim 4 wherein the holder is provided with a cover plate for excluding dust and said holding member is inwardly curved and pivotly hinged at one end and fixed by means of a set screw at the other end.

References Cited by the Examiner

UNITED STATES PATENTS 2,787,714    4/1957    Schulman et al. _____ 250—83 X

RALPH G. NILSON, *Primary Examiner.*

ARCHIE R. BORCHELT, *Examiner.*